(12) United States Patent
Shiota (10) Patent No.: US 8,107,019 B2
(45) Date of Patent: Jan. 31, 2012

(54) PROJECTION TYPE IMAGE DISPLAY DEVICE

(75) Inventor: Tetsuro Shiota, Osaka (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 12/440,814

(22) PCT Filed: Sep. 6, 2007

(86) PCT No.: PCT/JP2007/067380
§ 371 (c)(1),
(2), (4) Date: Mar. 11, 2009

(87) PCT Pub. No.: WO2008/032632
PCT Pub. Date: Mar. 20, 2008

(65) Prior Publication Data
US 2010/0039570 A1   Feb. 18, 2010

(30) Foreign Application Priority Data

Sep. 13, 2006  (JP) .................................. 2006-247717

(51) Int. Cl.
*H04N 5/12* (2006.01)
*G03B 21/14* (2006.01)
(52) U.S. Cl. ......................................... 348/748; 353/97
(58) Field of Classification Search .................. 348/748, 348/744, 750, 459; 353/97, 85, 88; 362/222, 362/282, 251; 359/594, 232, 332
See application file for complete search history.

(56) References Cited

U.S. PATENT DOCUMENTS

| 5,597,223 | A | 1/1997 | Watanabe et al. |
| 5,675,437 | A * | 10/1997 | Hart et al. ...................... 359/566 |
| 7,027,016 | B2 * | 4/2006 | Sakashita ........................ 345/84 |
| 7,088,058 | B2 * | 8/2006 | Shiota et al. ................... 315/291 |
| 7,207,679 | B2 * | 4/2007 | Totani et al. .................... 353/97 |
| 7,354,159 | B2 * | 4/2008 | Nakamura et al. .............. 353/85 |
| 7,474,289 | B2 * | 1/2009 | Sakashita ........................ 345/84 |

(Continued)

FOREIGN PATENT DOCUMENTS

JP   11-337897 A   12/1999

(Continued)

*Primary Examiner* — Paulos Natnael
(74) *Attorney, Agent, or Firm* — Hamre, Schumann, Mueller & Larson, P.C.

(57) ABSTRACT

A diaphragm control angle calculating portion 2 calculates an angle at which a diaphragm is controlled to control an amount of light that reaches from a lamp 6 to a display device 10 according to distribution information of an input video signal, such as the maximum value, the minimum value, the average value and the histogram of the signal, and the control angle is inputted to a fan control signal generating portion 3 and a diaphragm driving portion 8 as control angle information. The diaphragm driving portion 8 controls the angle of the diaphragm 9 based on the control angle information. Light from the lamp 6 driven by a lamp driving portion 5 enters the diaphragm 9, and the amount of light according to the angle of the diaphragm 9 enters the display device 10. The fan control signal generating portion 3 controls the rotation speed of a cooling fan 4 according to a combination of the control angle information and the temperature detected by a temperature sensor. A high-contrast display image can be produced while noise resulting from an increase in the rotation speed of the cooling fan can be suppressed and the reliability of the lamp can be ensured by avoiding the influence of the temperature.

4 Claims, 4 Drawing Sheets

U.S. PATENT DOCUMENTS

| | | | |
|---|---|---|---|
| 7,748,854 B2 * | 7/2010 | Sugino et al. | 353/97 |
| 2004/0080722 A1 * | 4/2004 | Yamasaki et al. | 353/97 |
| 2005/0068505 A1 | 3/2005 | Momose et al. | |
| 2006/0066818 A1 | 3/2006 | Nakamura et al. | |
| 2007/0064198 A1 * | 3/2007 | Yoshimura | 353/20 |
| 2007/0297175 A1 * | 12/2007 | Glent-Madsen | 362/282 |

FOREIGN PATENT DOCUMENTS

| | | |
|---|---|---|
| JP | 2004-118040 A | 4/2004 |
| JP | 2004-151674 A | 5/2004 |
| JP | 2004-264819 A | 9/2004 |
| JP | 2004-362820 A | 12/2004 |
| JP | 2006-091587 A | 4/2006 |

* cited by examiner

PROJECTION TYPE IMAGE DISPLAY DEVICE

TECHNICAL FIELD

The present invention relates to a projection type image display device such as a projector. In particular, the present invention relates to a projection type image display device configured to produce a high-contrast display image by controlling the amount of light that enters a display device with a diaphragm (aperture diaphragm).

BACKGROUND ART

As a projection type display device or a direct-view type liquid crystal display device, there is known an image display device that displays video by spatially modulating light emitted from a light source (hereinafter referred to as a lamp) with a display device having a transmission or reflective optical modulation effect. An image display device using a display device having such an optical modulation effect has a problem of so-called backlight bleeding in dark portions in comparison with an image display device using a self-light emitting display element such as a CRT. Backlight bleeding is a phenomenon in which black-displaying pixels are observed as glowing in a pitch dark environment when the illumination is turned off.

As one of the methods of suppressing the backlight bleeding and thereby improving the contrast of a display image, there has been proposed a method in which the emission brightness of the lamp and the diaphragm disposed in a light path from the lamp to the display device are changed dynamically in accordance with the scene of input video so as to control the amount of light that enters the display device. For example, the method is disclosed in Patent Document 1.

Patent Document 1 discloses that the contrast is improved by detecting the characteristics of the input video signal, and controlling the power of the lamp according to the detected characteristics. As the power of the lamp is changed according to the input video signal, the rotation speed of a cooling fan is controlled to maintain the temperature of the lamp within a range where the reliability of the lamp can be ensured.

Patent Document 1: JP H11-337897A

DISCLOSURE OF INVENTION

Problem to be Solved by the Invention

The demand for the improvement in the contrast of images produced by consumer products has grown in recent years. Thus, in order to improve the contrast of images produced by projection type image display devices, a structure in which a diaphragm is inserted in a light path from the lamp to the display device has been adopted. With this structure, when a video signal for a dark scene is inputted, the opening/closing angle of the diaphragm is controlled according to the level of the input signal so as to adjust incident light to the display device, and thereby the contrast can be improved.

In addition, as liquid crystal projectors have become popular in the consumer market, there is a demand that they have the capability to function as a large-screen TV. In order to meet the demand for an increase in the brightness of display video, it is desired that the light amount is increased by increasing the power of a light source. Furthermore, in order to meet the demand for an increase in the contrast, it is desired that the adjustment range of the light amount is broadened by further broadening the control range of the diaphragm.

In the case of improving the contrast by changing the power of the lamp according to a video signal as in the conventional example, the contrast only can be improved up to 1.4 times due to the limitation of the power variable range of the lamp. In contrast, in the case of controlling the diaphragm according to a video signal, the contrast can be improved up to about five times.

In the case of inserting a diaphragm, a configuration in which the diaphragm is disposed right in front of the lamp has been the mainstream under the present circumstances taking into account the constraints of the picture quality and the cost.

However, when the light amount of the lamp is increased to meet the above demands, or the diaphragm is closed sufficiently, an amount of return light reflected by the diaphragm increases, and heat damage is caused to the lamp and peripheral parts such as fixing hardware. In particular, when the angle of the diaphragm is increased, return light from the diaphragm reaches not less then 20% of the amount of incident light. Therefore, appropriate cooling capability is required.

Thus, when return light is considered to become the largest, the rotation speed of the cooling fan needs to be increased sharply.

Further, in the conventional method, since the temperature in the vicinity of the lamp is measured, the temperature of the lamp bulb (vessel) itself, which becomes extremely hot, cannot be measured accurately.

Accordingly, in order to ensure the reliability of the lamp, it is necessary further to increase the rotation speed of the cooling fan so as to provide an allowance for the cooling capability. This results in an increase in noise.

With the foregoing in mind, it is an object of the present invention to provide a projection type image display device that can produce a high-contrast display image while suppressing the noise resulting from an increase in the rotation speed of the cooling fan, and ensuring the reliability of the lamp by avoiding the influence of temperature.

Means for Solving Problem

In order to solve the above problem, a projection type image display device with a first configuration of the present invention includes: a lamp as a light source; a diaphragm for adjusting an amount of light irradiated from the lamp; a display device for generating image light by spatially modulating light that passed though the diaphragm: a projection lens for magnifying and projecting light outputted from the display device; a lamp driving portion for controlling power of the lamp; a cooling fan for cooling the lamp; a temperature sensor for detecting an ambient temperature of the lamp; a video signal input terminal to which a video signal is inputted; a diaphragm control angle calculating portion for calculating an angle at which the diaphragm is controlled according to the level of an input video signal inputted from the video signal input terminal, and outputting the angle as control angle information; a diaphragm driving portion for controlling the angle of the diaphragm according to the control angle information; a fan control signal generating portion for controlling the rotation speed of the cooling fan according to a combination of the control angle information and the temperature detected by the temperature sensor; and a display device driving portion for converting the input video signal into a signal that allows the display device to display.

A projection type image display device with a second configuration of the present invention includes: a lamp as a light source; a diaphragm for adjusting an amount of light irradiated from the lamp; a display device for generating image light by spatially modulating light that passed though the diaphragm: a projection lens for magnifying and projecting light outputted from the display device; a lamp driving portion for controlling power of the lamp; a cooling fan for cooling the lamp; a temperature sensor for detecting an ambient temperature of the lamp; a video signal input terminal to which a video signal is inputted; a diaphragm control angle calculating portion for calculating an angle at which the diaphragm is controlled according to the level of an input video signal inputted from the video signal input terminal, and outputting the angle as control angle information; a diaphragm driving portion for controlling the angle of the diaphragm according to the control angle information; a video-signal-based fan control data calculating portion for generating a signal corresponding to an amount of return light from the diaphragm to the lamp according to the level of the input video signal, and outputting the signal as fan control data; a fan control signal generating portion for controlling rotation speed of the cooling fan according to a combination of the control angle information and the temperature detected by the temperature sensor; and a display device driving portion for converting the input video signal into a signal that allows the display device to display.

Effects of the Invention

In the projection type image display device of the present invention, the temperature of the lamp bulb itself can be controlled accurately by estimating an amount of return light to the lamp from the diaphragm control angle information according to the level of the input video signal, and controlling the rotation speed of the fan using the estimate in combination with the information on the temperature in the vicinity of the lamp. Thus, the reliability of the lamp in high temperatures can be ensured. Further, it is also possible to avoid an excessive increase of the rotation speed of the fan, and the noise resulting from the rotating sound of the fan also can be reduced.

DESCRIPTION OF REFERENCE NUMERALS 1 video signal input terminal
2 diaphragm control angle calculating portion
3 fan control signal generating portion
4 cooling fan
5 lamp driving portion
6 lamp
7 temperature sensor
8 diaphragm driving portion
9 diaphragm
10 display device
11 display device driving portion
12 projection lens
13 screen
14 video-signal-based fan control data calculating portion

DESCRIPTION OF THE INVENTION

The projection type image display device of the present invention, having the basic structure as described above, can be configured as follows.

That is, in the projection type image display device with the first configuration, the diaphragm control angle calculating portion may calculate an angle at which the diaphragm is controlled according to distribution information of the input video signal, such as the maximum value, the minimum value, the average value and the histogram of the signal.

Further, in the projection type image display device with the second configuration, the diaphragm control angle calculating portion may calculate an amount of return light from the diaphragm according to distribution information of the input video signal, such as the maximum value, the minimum value, the average value and the histogram of the signal.

Hereinafter, preferred embodiments of the present invention will be described with reference to the drawings.

Embodiment 1

Figure 1:
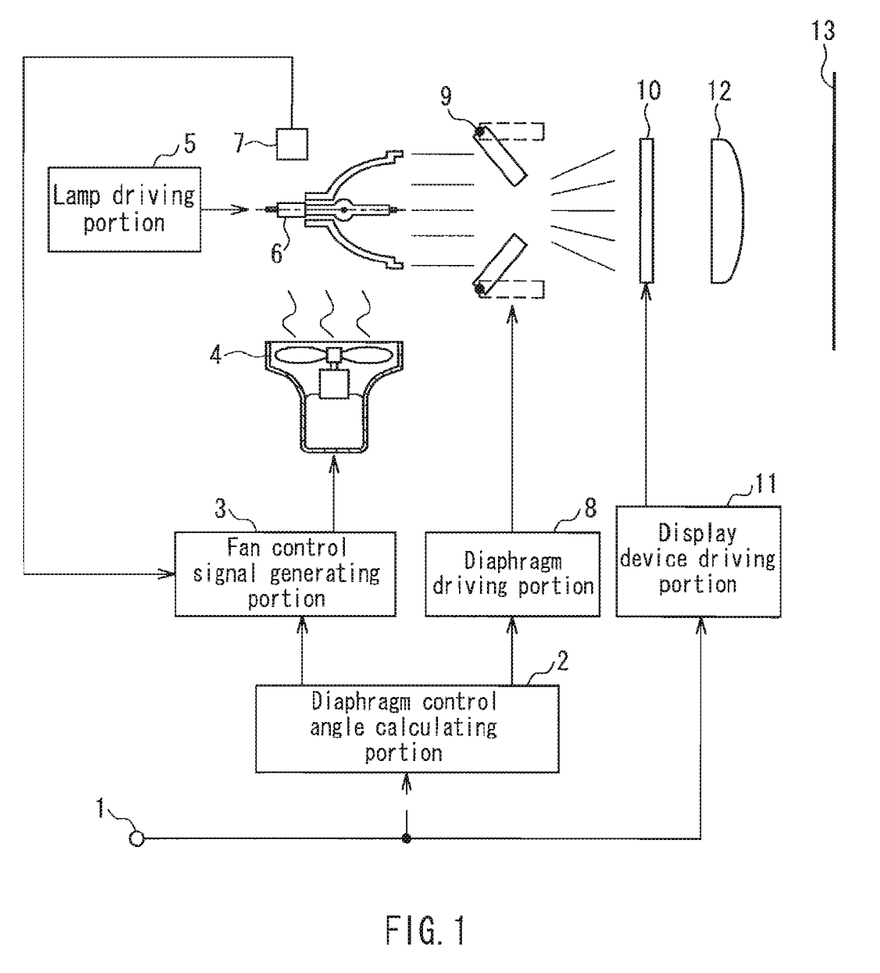
FIG. 1 is a block diagram showing a projection type image display device according to Embodiment 1 of the present invention.

FIG. 1 is a block diagram showing a configuration of a projection type image display device according to Embodiment 1 of the present invention.

In FIG. 1, a video signal inputted from a video signal input terminal 1 is supplied to a diaphragm control angle calculating portion 2 and a display device driving portion 11. The diaphragm control angle calculating portion 2 has the capability of calculating control angle information with respect to a diaphragm according to the characteristics of the video signal. The control angle information outputted by the diaphragm control angle calculating portion 2 is supplied to a fan control signal generating portion 3 and a diaphragm driving portion 8. The fan control signal generating portion 3 controls the rotation speed of a cooling fan 4 based on ambient temperature information supplied from a temperature sensor 7 and the control angle information.

A lamp driving portion 5 controls the power of a lamp 6. Output light from the lamp 6 passes though the diaphragm 9, and is irradiated on a display device 10 such as a liquid crystal display element. The diaphragm driving portion 8 controls the angle of the diaphragm 9 based on the control angle information supplied from the diaphragm control angle calculating portion 2.

The display device driving portion 11 converts the input video signal into the form of a signal that can drive the display device 10, and drives the display device 10. Irradiation light from the lamp 6 is spatially modulated in reflective or transmission properties according to the image displayed on the display device 10, forming image light. The image light from the display device 10 is magnified and projected on a screen 13 by a projection lens 12.

An operation of the projection type image display device according to the present embodiment configured as above will be described in detail. First, the diaphragm control angle calculating portion 2 detects the distribution information of the input video signal inputted by the video signal input terminal 1, such as the maximum value, the minimum value, the average value or the histogram of the signal, calculates an amount of light to be made incident on the display device 10, in other words, the control angle of the diaphragm 9, in accordance with either one of the values of the distribution information or a combination thereof, and inputs the control angle as control angle information to the fan control signal generating portion 3 and the diaphragm driving portion 8. The diaphragm driving portion 8 controls the angle of the diaphragm 9 based on the control angle information inputted thereto in the following manner: assuming that the control angle information can be expressed by 0 to 255 for example, the diaphragm driving portion 8 fully opens the diaphragm 9 when the information is 0 and fully closes the diaphragm 9 when the information is 255. Light from the lamp 6 that enters the diaphragm 9 is adjusted into a light amount corresponding to the angle of the diaphragm 9, and is made incident on the display device 10.

The display device 10 can be any spatial optical modulating device such as a transmission liquid crystal type, a reflection liquid crystal type, or a DMD type device. A DMD type spatial optical modulating device is a device that controls an amount of effective light by changing the reflection angle of a mirror corresponding to pixels in accordance with the video level of the pixels.

In accordance with the control angle information of 0 to 255, return light from the diaphragm 9 to the lamp 6 becomes the largest when the diaphragm has the largest angle (control angle information=0). Since the ambient temperature of the bulb of the lamp 6 increases as a result, the fan control signal generating portion 3 increases the rotation speed of the cooling fan 4 for cooling the periphery of the lamp 6. Further, return light from the diaphragm 9 to the lamp becomes the smallest when the diaphragm has the smallest angle (control angle information=255). Since the ambient temperature of the bulb of the lamp 6 drops as a result, the fan control signal generating portion 3 reduces the rotation speed of the cooling fan 4 for cooling the periphery of the lamp 6. When the angle of the diaphragm is between the largest and the smallest (0 to 255), the fan control signal generating portion 3 controls the rotation speed of the cooling fan 4 so as to interpolate between the return light of the largest and the smallest amounts.

In addition to return light from the diaphragm 9, the outside air (temperature, pressure and the like) in which the device set is placed also affects the temperature of the periphery of the lamp 6. Thus, an output of the temperature sensor 7 for measuring the temperature in the vicinity of the cooling fan 4 is inputted to the fan control signal generating portion 3, together with the control angle information. The fan control signal generating portion 3 controls the rotation speed of the cooling fan 4 based on the control angle information and the output of the temperature sensor 7. In this way, the cooling fan 4 is controlled based on the output of the fan control signal generating portion 3.

The following method can be used, for example, to combine the control based on the control angle information and the control based on the output of the temperature sensor 7. That is, the fan control signal generating portion 3 calculates, for example, the average value of the angle of the diaphragm during the previous one minute using the control angle information. On the basis of the information on the average value of the angle of the diaphragm, a sum of return light using the diaphragm 9 to the lamp 6 per minute is predicted. The return light predicted value is combined with the temperature information (the temperature in the periphery of the lamp) from the temperature sensor 7 in order to control the rotation speed of the fan 4.

Figure 2:
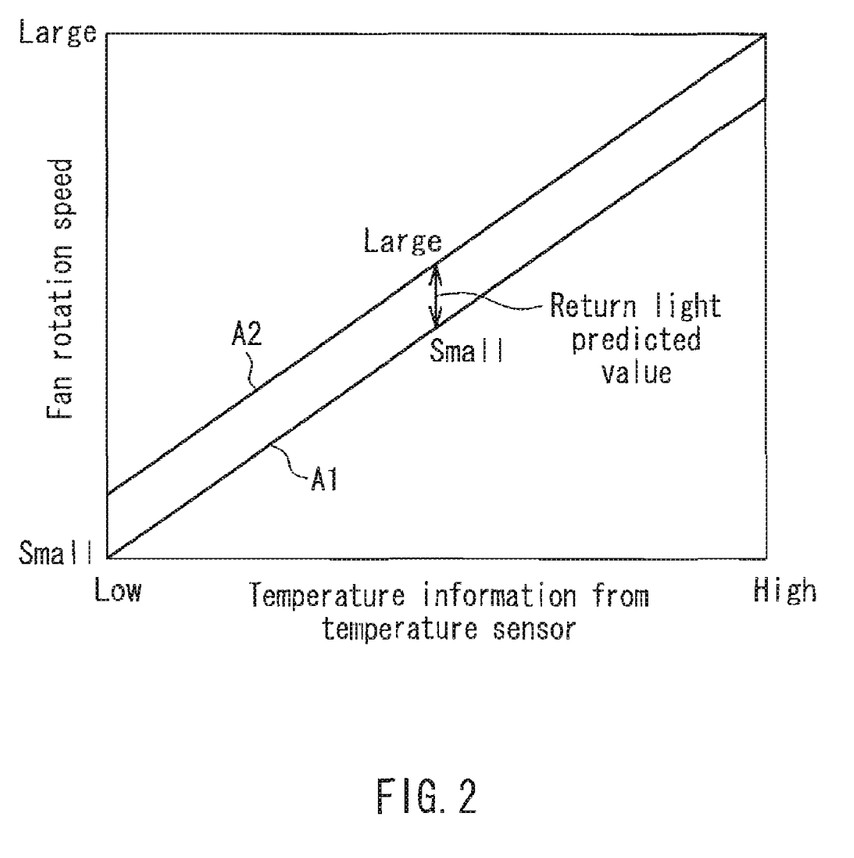
FIG. 2 is a diagram showing control properties of fan rotation speed in the projection type image display device.

For example, as shown in FIG. 2, the relationship of the fan rotation speed with the temperature information can be indicated by control properties A1, A2 and the like. The control properties A1, A2 and the like are selected according to the return light predicted value. That is, for the same temperature information value, when the return light predicted value is small the fan rotation speed is reduced based on the control property A1, and when the return light predicted value is large the fan rotation speed is increased based on the control property A2. In this way, the control is carried out based on the control properties that shift up and down according to the return light predicted value as shown in FIG. 2.

The relationship between the temperature information and the fan rotation speed may be linear as shown in FIG. 2 or stepwise, in four levels for example. Appropriate control properties can be set in accordance with the configuration of the projection type image display device, the usage environment and the like. Further, the above-mentioned method of combining the control based on the control angle information and the control based on the output of the temperature sensor 7 is just one example, and various methods suited for various conditions can be adopted.

The main point of the control carried out on the cooling fan 4 in the present invention is always to detect the information on the temperature of the lamp bulb correctly, and to cool the lamp appropriately. If it is possible to dispose the temperature sensor 7 in the vicinity of the bulb of the lamp 6 so as to measure the temperature of the lamp bulb itself, cooling can be carried out always so as to satisfy the cooling conditions of the lamp. However, if a temperature measuring means such as a thermocouple is connected directly to the lamp bulb itself, light is shaded. Thus, it is practically impossible to measure the temperature of the lamp bulb itself directly. Further, when the temperature is measured only with a temperature sensor disposed somewhat distantly from the lamp bulb, an error is introduced in the measurement results and following the temperature is delayed.

In contrast, in the present embodiment, the accuracy of the temperature information of the lamp bulb can be improved due to the combined use of the diaphragm control angle calculating portion 2 and the temperature sensor 7. That is, the rotation speed of the cooling fan 4 is controlled according to both of the following conditions: conditions of the temperature change in the vicinity of the lamp 6 detected by the temperature sensor 7 due to a change in environmental air outside the device-set; and conditions of real-time temperature change of the lamp bulb due to an amount of return light to the lamp 6 that varies according to the angle of the diaphragm 9 that changes according to the input video signal. In other words, by calculating the amount of return light from the diaphragm 9 to the lamp 6 based on the angle of the diaphragm 9, and combining an increase in the temperature of the lamp bulb due to the amount of return light with the ambient temperature of the lamp 6, the temperature of the lamp bulb itself can be estimated with high accuracy, and the rotation speed of the cooling fan 4 can be controlled in a state where the cooling conditions of the lamp are determined appropriately.

In this way, without providing a temperature measuring means such as a thermocouple directly to the lamp bulb itself, the temperature of the lamp bulb always can be estimated with high accuracy, and cooling suited for the cooling conditions needed by the lamp always can be carried out.

Consequently, the reliability of the lamp is ensured, and the life of the lamp can be prolonged until the lamp blows out or the light amount of the lamp drops.

Embodiment 2

Figure 3:
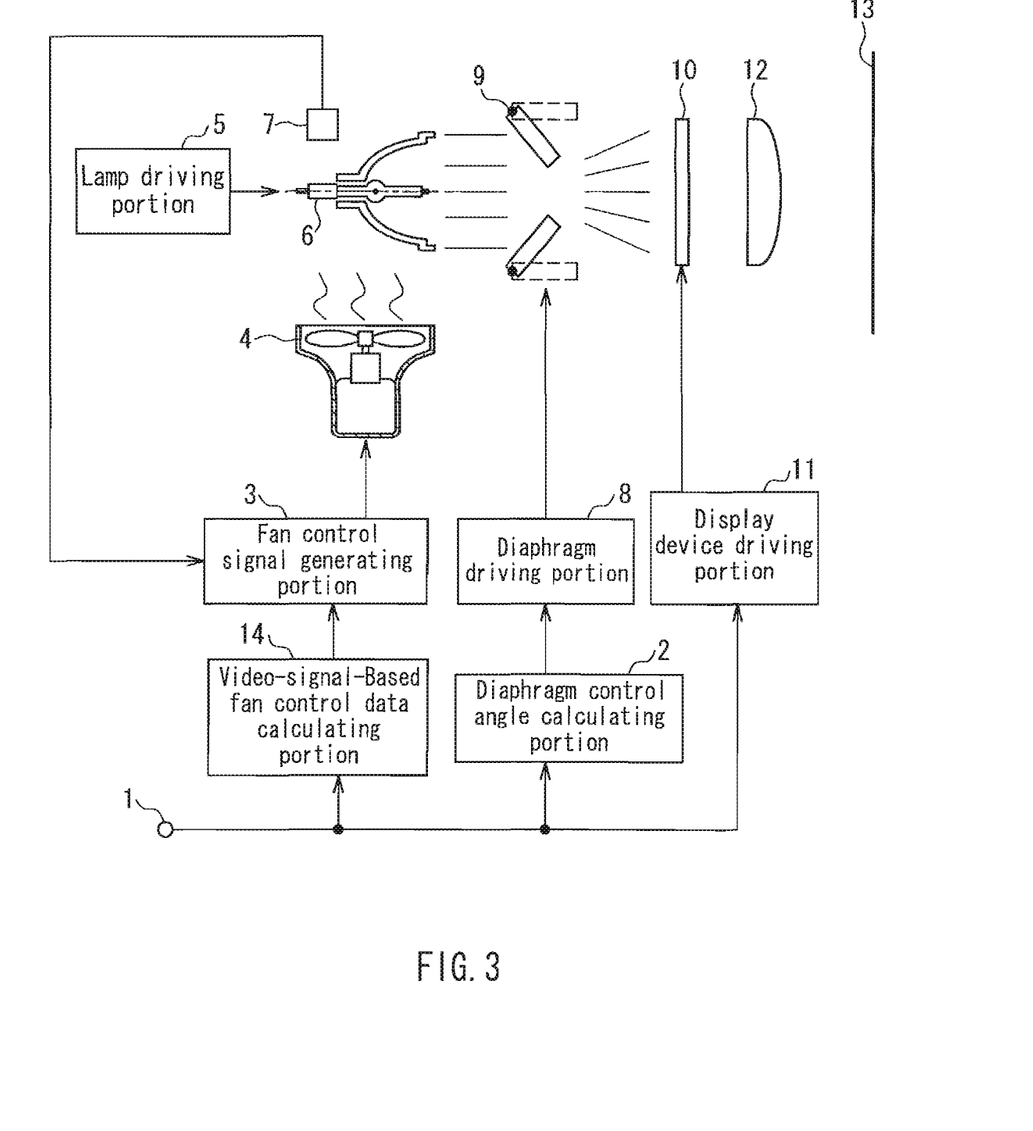
FIG. 3 is a block diagram showing a projection type image display device according to Embodiment 2 of the present invention.

FIG. 3 is a block diagram showing a configuration of a projection type image display device according to Embodiment 2 of the present invention. In FIG. 3, the same components as in Embodiment 1 shown in FIG. 1 are assigned with the same reference numerals and the description thereof will not be repeated.

In Embodiment 1, control angle information outputted from the diaphragm control angle calculating portion 2 is used as an input signal to the fan control signal generating portion 3. In contrast, in the present embodiment, a signal obtained by processing a video signal inputted to the video signal input terminal 1 with a video-signal-based fan control data calculating portion 14 is used as an input signal to the fan control signal generating portion 3.

The video-signal-based fan control data calculating portion 14 calculates an amount of return light from the diaphragm 9 based on the distribution information of the video signal, such as the maximum value, the minimum value, the average value and the histogram of the signal, and generates fan control data that is different from control angle information.

By generating the fan control data that is different from the control angle information as an output of the diaphragm control angle calculating portion 2, it is possible to deal with the case where the control angle of the diaphragm 9 and return light to the lamp 6 are not in a linear relationship due to the shape of the blades of the diaphragm 9 or a method of controlling the angle. That is, in addition to the diaphragm control angle calculating portion 2, the video-signal-based fan control calculating portion 14 for calculating return light from the diaphragm 9 based on a video signal is provided to supply an output corresponding to the amount of return light from the diaphragm 9 as fan control data to the fan control signal generating portion 3. Consequently, the cooling fan 4 can be controlled according to the amount of return light from the diaphragm 9 in response to the video signal.

As described above, in the present embodiment, the accuracy of the temperature information of the lamp bulb can be improved due to the combined use of the video-signal-based fan control calculating portion 14 and the temperature sensor 7. That is, since the amount of return light to the lamp 6 is varied when changing the angle of the diaphragm 9 according to the input video signal, the amount of return light to the lamp 6, which varies according to the angle of the diaphragm 9, is calculated based on the input video signal so as to generate fan control data. With respect to the conditions of temperature change in the vicinity of the lamp 6 detected by the temperature sensor 7 due to a change in environmental air outside the device-set, an estimated value based on calculation of an increase in the temperature of the lamp bulb due to the amount of return light is combined as fan control data. Thus the rotation speed of the fan 4 can be controlled on the basis of the conditions of real-time temperature change of the lamp bulb.

The method of combining the control based on the control angle information and the control based on an output of the temperature sensor 7 described in Embodiment 1 can be used similarly to combine the control based on the fan control data and the control based on the output of the temperature sensor 7. However, in this method, the average value of the angle of the diaphragm and the return light predicted value in the method described in Embodiment 1 are calculated by the video-signal-based fan control data calculating portion 14, and fan control data is supplied to the fan control signal generating portion 3 as data corresponding to the return light predicted value.

Figure 4:
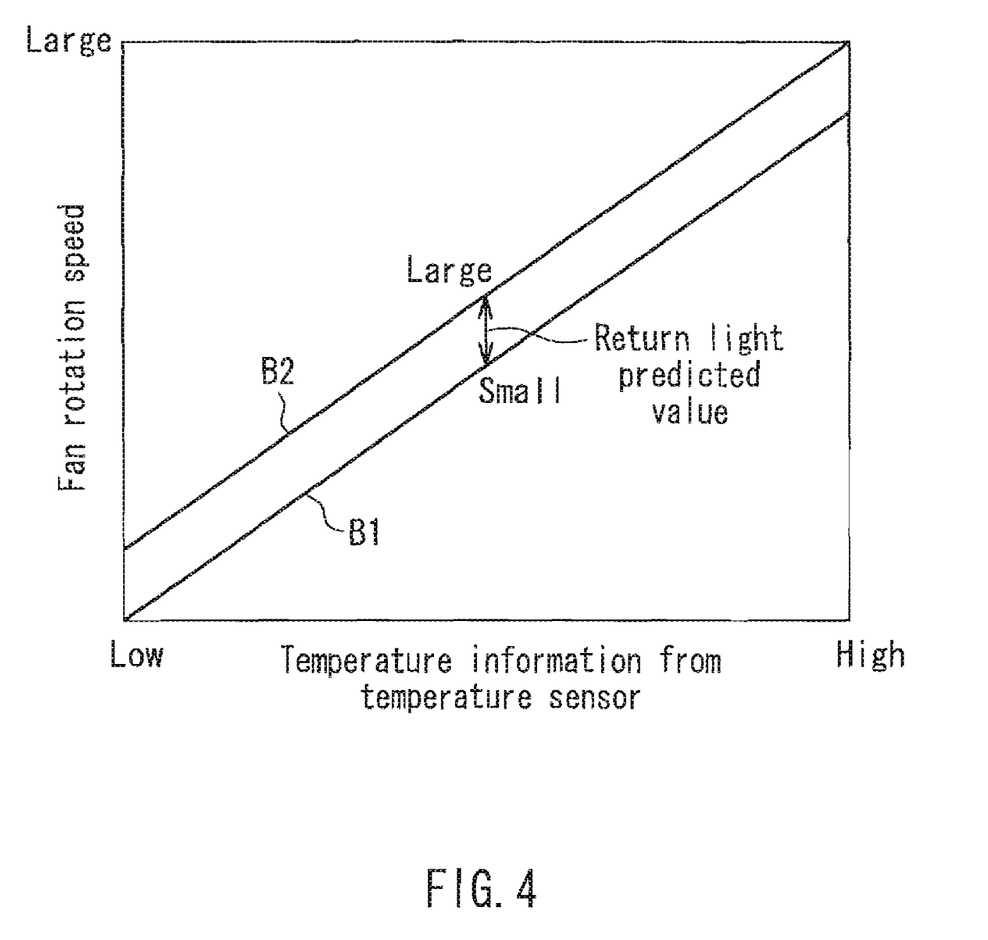
FIG. 4 is a diagram showing control properties of fan rotation speed in the projection type image display device.

Accordingly, in the present embodiment, the relationship of the fan rotation speed with the temperature information shown in FIG. 2 can be indicated by control properties B1, B2 and the like shown in FIG. 4. Though the control properties B1 and B2 show properties similar to the control properties A1 and A2 in FIG. 2, they are not selected according to the return light predicted sum, but selected according to fan control data. Nevertheless, fan control data essentially is similar to a return light predicted sum.

As described above, according to the present embodiment, the temperature of the lamp bulb always can be estimated with high accuracy without connecting a temperature measuring means such as a thermocouple directly to the lamp bulb itself, and cooling suited for the cooling conditions needed by the lamp always can be carried out.

Consequently, the reliability of the lamp is ensured, and the life of the lamp can be prolonged until the lamp blows out or the light amount of the lamp drops.

INDUSTRIAL APPLICABILITY

The projection type image display device according to the present invention can produce a high-contrast display image while ensuring the reliability of the lamp with highly accurate temperature control. Thus, the present invention is suited for a projection type image display device such as a projector.

The invention claimed is:
1. A projection type image display device comprising:
a lamp as a light source;
a diaphragm for adjusting an amount of light irradiated from the lamp;
a display device for generating image light by spatially modulating light that passed though the diaphragm:
a projection lens for magnifying and projecting light outputted from the display device;
a lamp driving portion for controlling power of the lamp;
a cooling fan for cooling the lamp;
a temperature sensor for detecting an ambient temperature of the lamp;
a video signal input terminal to which a video signal is inputted;
a diaphragm control angle calculating portion for calculating an angle at which the diaphragm is controlled according to a level of an input video signal inputted from the video signal input terminal, and outputting the angle as control angle information;
a diaphragm driving portion for controlling the angle of the diaphragm according to the control angle information;
a fan control signal generating portion for controlling rotation speed of the cooling fan according to a combination of the control angle information and the temperature detected by the temperature sensor; and
a display device driving portion for converting the input video signal into a signal that allows the display device to display.

2. The projection type image display device according to claim 1, wherein the diaphragm control angle calculating portion calculates an angle at which the diaphragm is controlled according to distribution information of the input video signal, such as a maximum value, a minimum value, an average value and a histogram of the signal.

3. A projection type image display device comprising:
a lamp as a light source;
a diaphragm for adjusting an amount of light irradiated from the lamp;
a display device for generating image light by spatially modulating light that passed though the diaphragm:
a projection lens for magnifying and projecting light outputted from the display device;
a lamp driving portion for controlling power of the lamp;
a cooling fan for cooling the lamp;

a temperature sensor for detecting an ambient temperature of the lamp;

a video signal input terminal to which a video signal is inputted;

a diaphragm control angle calculating portion for calculating an angle at which the diaphragm is controlled according to a level of an input video signal inputted from the video signal input terminal, and outputting the angle as control angle information;

a diaphragm driving portion for controlling the angle of the diaphragm according to the control angle information;

a video-signal-based fan control data calculating portion for generating a signal corresponding to an amount of return light from the diaphragm to the lamp according to the level of the input video signal, and outputting the signal as fan control data;

a fan control signal generating portion for controlling rotation speed of the cooling fan according to a combination of the control angle information and the temperature detected by the temperature sensor; and a display device driving portion for converting the input video signal into a signal that allows the display device to display.

4. The projection type image display device according to claim 3, wherein the diaphragm control angle calculating portion calculates an amount of return light from the diaphragm according to distribution information of the input video signal, such as a maximum value, a minimum value, an average value and a histogram of the signal.

* * * * *